Feb. 11, 1958     E. E. MAXSON     2,823,066
TRAILER AND TRUCK BODY CONSTRUCTION
Filed April 22, 1955
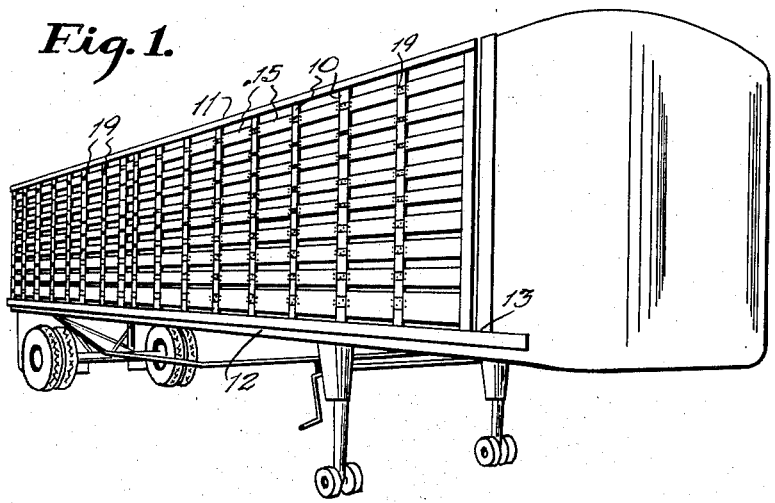
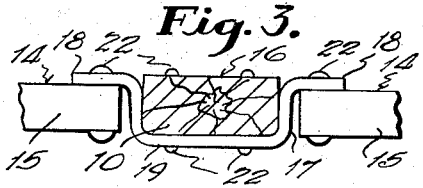
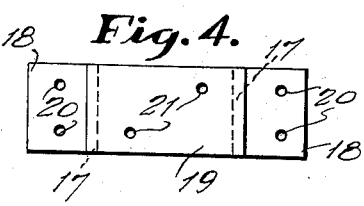
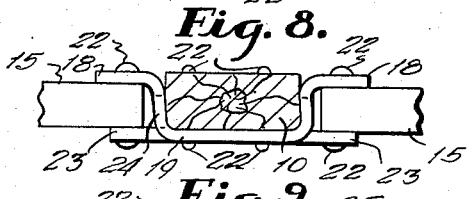
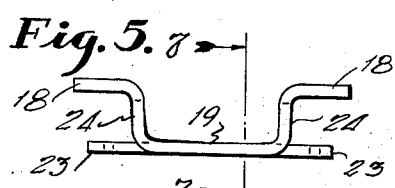
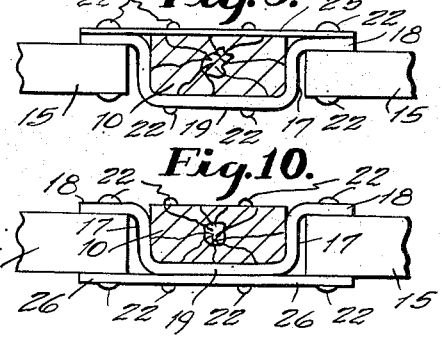
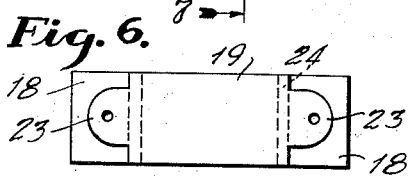
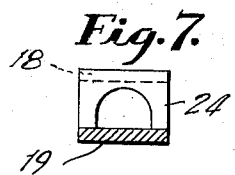
Elvin E. Maxson
INVENTOR.
BY *Cecil L. Wood*
ATTORNEY

United States Patent Office 2,823,066
Patented Feb. 11, 1958

2,823,066

TRAILER AND TRUCK BODY CONSTRUCTION

Elvin E. Maxson, Fort Worth, Tex., assignor to Hyde Corporation, Fort Worth, Tex., a corporation of Texas Application April 22, 1955, Serial No. 503,279

2 Claims. (Cl. 296—29)

This invention relates to body construction for trucks and trailers of the type generally employed for transporting livestock, and the like, and it has particular reference to the construction of open type bodies having vertical, horizontally spaced stays or stakes and horizontal slats spaced vertically, and the principal object of the invention resides in the provision of a device by which the horizontal slats can be connected to the vertical stakes in such a manner as to increase the capacity of the truck or trailer without sacrificing the strength or durability of the sideboards thus formed.

A further object of the invention resides in the provision of a truck or trailer body construction in which the horizontal members of the body can be arranged in such a manner that the internal surfaces of the slats are in substantial alignment with the internal surfaces of the stakes or stays, providing a trailer or truck body having greater capacity and yet presenting a more attractive appearance in which damaged or worn parts can be replaced more readily than in bodies of conventional design.

It is an object of the invention to afford a truck or trailer body which may be constructed with solid panels, if desired, as when the vehicle is employed for transporting grain, and similar products, where the open type of sideboards are not practicable, affording a means for coupling the panels to the upright stakes in such a manner as to provide for additional hauling space usually consumed through the practice of installing the slats or panels internally of the upright stakes.

Broadly, the invention contemplates the provision of a simple and inexpensive coupling device which can be installed on each stake at spaced intervals for attaching the ends of the horizontal slats to the stakes, as by bolts, rivets, or other device, by which a rigid construction can be accomplished while substantially increasing the hauling capacity of the body.

While the foregoing objects are paramount, other and lesser objects will become manifest as the description proceeds, taken in connection with the appended drawings wherein:

Figure 1 is a perspective view of a conventional type of trailer designed for hauling livestock, and the like, in which the invention is embodied.

Figure 2 is a plan view of one form of the coupler device.

Figure 3 illustrates the device shown in Figure 2 and its application for securing the ends of the horizontal slats to the vertical standards or stakes.

Figure 4 is a front elevational view of the form of the invention shown in Figures 2 and 3.

Figure 5 is a plan view of a modified form of the coupler device, in which portions are cut out and extended to be applied to the ends of the slat members.

Figure 6 illustrates a front elevational view of the form of the invention shown in Figure 5.

Figure 7 is a transverse sectional view of the form of the invention illustrated in Figures 5 and 6, taken on lines 7—7 of Figure 5.

Figure 8 illustrates the form of the invention, illustrated in Figures 5, 6 and 7, as applied to a vertical stake.

Figure 9 illustrates, in plan, the application of the form of the coupler device illustrated in Figures 2 and 4, having a plate arranged across the stake member, the latter being illustrated in transverse section, and Figure 10 illustrates, in plan, the application of the coupler device shown in Figures 2 and 4 in which a plate is applied to the exterior of the stake and the slats to increase rigidity thereof.

Accordingly, therefore, the sideboard construction which constitutes the invention is illustrated in application in Figure 1 and comprises the provision of a plurality of vertical stakes or standards 10 which are horizontally spaced, as desired, and connected across their upper ends by an angle iron 11, or other suitable means, to insure sufficient rigidity for the sideboard structure. The lower ends of the stakes or standards 10 are inserted in conventional sockets spaced about the platform 12 of the vehicle and may be enclosed by a strip 13, if desired, such as that shown in Figure 1.

It is conventional practice to arrange the horizontal members of the body transversely of the stake 10, securing the same thereto by bolts, rivets or other device, but the carrying or hauling space of the vehicle is reduced to the extent of the thickness of the horizontal slats or bars on each side and each end of the vehicle which, when multiplied, substantially minimizes the interior or hauling capacity. It is therefore an object of the invention to provide means whereby the capacity of the vehicle can be increased by several square feet by moving the horizontal slats outwardly and arranging the same so that their ends abut the stake members 10 on each side so that the interior surfaces 14 of the horizontal slats 15 are substantially in alignment with the internal surfaces 16 of the stakes or standards 10, in the manner illustrated in Figures 3, 8, 9 and 10.

The invention is primarily exemplified in a metal coupler member 17 which is substantially U-shaped, as shown in Figure 2, and has extended flanges 18 which are opposingly arranged, as shown in Figure 2, and whose plane surfaces are parallel to the main portion 19 of the U-shaped member 17. Apertures 20 and 21, shown in dotted lines in Figure 2, provide means whereby bolts, rivets, or other suitable devices 22, can be employed for attaching the ends of the slats or horizontal bars or slats 15 to the members 17 and the vertical stakes 10, in the manner shown in Figures 3, 8, 9 and 10.

The coupler members 17 are modified, as illustrated in Figures 5, 6 and 8, in which opposing tabs 23 are cut from the legs 24 of the members 17 so that these members can be extended in a plane aligned with that of the members 18 and 19, to provide a more rigid structure so that the slats 15 can be extended into the space defined between the members 18 and 23 and secured by the bolts or rivets 22. In Figures 9 and 10 is illustrated a modified arrangement whereby the coupler member 17 can be employed with a plate 25 applied across the internal surfaces of the stakes 10 and secured by the rivets or bolts 22, or by a plate 26 arranged across the portion 19 of the members 17, externally of the body structure to overreach the ends of the slats 15 and be secured by the rivets or bolts 22 in the same manner as the members 23 are attached to the ends of the slats 15, as illustrated in Figures 3, 8, 9 and 10.

Manifestly, the structure herein shown and described is capable of certain changes and modifications, from time to time, by persons skilled in the art without departing from the spirit and intent of the invention or the scope of the appended claims.

What is claimed is:

1. In a trailer and truck body construction, in combination, a series of spaced vertical standards, horizontal vertically spaced slats supported on said standards, the said slats being arranged in independent series between said standards and the said slats of each series being in horizontal alignment with those of the other series, coupler members on each of said standards aligned with the said vertically spaced slats of each series, each of the said coupler members being substantially U-shaped and generally embracing the outer surface and each edge of each of said standards, integral flanges formed on the legs of said U-shaped coupler and integral cut-out portions on said members extending from each side thereof in alignment with and spaced from said flanges and securable to the ends of said slats in each series thereof.

2. In a trailer and truck body construction of open design, in combination, a series of vertical horizontally spaced standards, a series of vertically spaced horizontal slats secured between said standards, a U-shaped coupler member on each of said standards arranged in longitudinal alignment with each tier of said slats and having opposing flanges formed therewith rigidly connecting the ends of said slats, the said coupler members being formed to partially embrace said standards and having cut-out portions formed with and projecting from the ends thereof and parallel to said flanges providing for connecting said standards and said slats thereto in a rigid assembly whereby the inner surfaces of said standards and said slats are substantially aligned.

References Cited in the file of this patent

UNITED STATES PATENTS

| | | |
|---|---|---|
| 2,438,428 | Birdsall | Mar. 23, 1948 |
| 2,579,774 | Akey | Dec. 25, 1951 |

FOREIGN PATENTS

| | | |
|---|---|---|
| 72,825 | Norway | Nov. 17, 1947 |